May 9, 1967  R. A. TYLER  3,318,574

GAS TURBINE ENGINE

Filed Nov. 30, 1964

United States Patent Office 3,318,574
Patented May 9, 1967

3,318,574
GAS TURBINE
Ronald A. Tyler, Ottawa, Ontario, Canada, assignor to Canadian Patents and Development Limited, Ottawa, Ontario, Canada, a corporation of Canada
Filed Nov. 30, 1964, Ser. No. 414,650
2 Claims. (Cl. 253—59)

This invention relates to gas turbines and gas turbine systems, and is more particularly applicable to gas turbines intended for traction uses, for example in locomotives, automobiles or other vehicles.

In a specific form, the invention is concerned with a system comprising a gas generator and a gas turbine. The gas generator, as is conventional, may comprise a compressor supplying air to a combustor where the fuel is burnt to generate pressure gas that passes first through a turbine that is mounted on the shaft of the compressor and drives the same. The gas leaving the compressor turbine of the gas generator passes to the traction turbine where useful work is developed in a load shaft for transmission to the wheels of the vehicle. Finally, the gas passes to exhaust.

Problems arise in such systems, when they are called upon to idle with the vehicle at standstill, a common practical requirement both in automobile and locomotive applications. A traction turbine is normally connected positively to the wheels of the vehicle, so that when the latter is at standstill with the brakes applied, the rotor of the traction turbine is held stationary. Nevertheless a certain volume of gas will continue to pass through the traction turbine, due to the fact that the gas generator must be kept idling. Difficulty has been experienced in designing such systems to have an acceptable combination of reasonable idling economy with sufficiently rapid acceleration from standstill. As soon as the vehicle is required to move forward (for example, in an automobile, the driver removes his foot from the brake and depresses the accelerator pedal), substantial power is required immediately from the traction turbine. However, before this power can be deevloped, it is necessary first for the gas generator to accelerate from its idling condition to develop its maximum output to supply full power to the traction turbine. This requirement tends to introduce a time lag between the moment of throttle opening and the time when power is developed in the traction turbine. Even a delay of a second or so is undesirable in automobile applications. One way in which the problem can be minimized is to arrange for the gas generator to idle at a comparatively high speed (that is, the speed of the turbine compressor shaft), but this solution is wasteful of fuel and is consequently uneconomical.

One of the objects of the present invention is to provide a turbine for use in such a system in which one of these alternative disadvantages (slow starting, or high fuel consumption during idling) can be ameliorated without adverse reflection on the other. For example, for a given expenditure of fuel when idling, a more rapid acceleration from standstill is made available; or alternatively, for the same rapidity of acceleration from standstill, a more economical idling is obtainable.

A related problem arises in locomotive applications. Some time lag between the opening of the throttle and the appearance of power at the wheels is less advantageous in locomotives than in automobiles. On the other hand, in railway application a high initial starting torque is important. For this reason a further object of the present invention is to provide a turbine system in which for a given gas generator output the available standstill torque of the traction is enhanced.

It has been discovered that both these objects can be achieved by the same modification to a conventional traction turbine construction.

One method of carrying the invention into practice is illustrated diagrammatically in the accompanying drawings. It is to be understood that these drawings are provided by way of example only, and not by way of limitation of the scope of the invention, which scope is defined in the appended claims.

Figure 1:
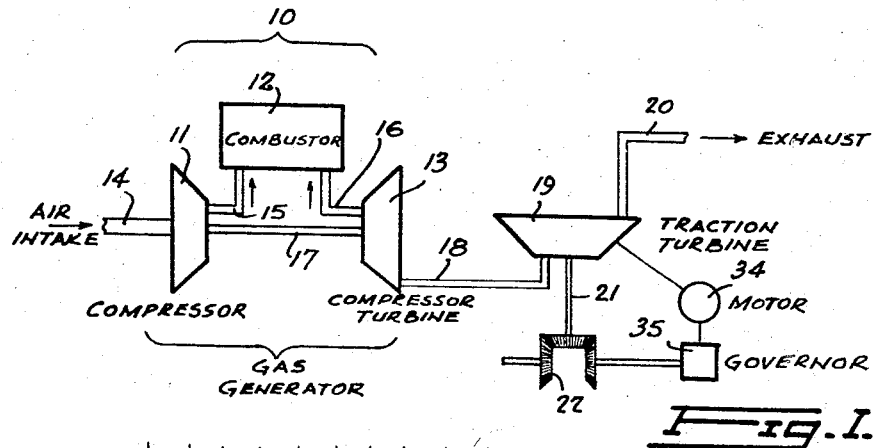
FIGURE 1 is a block diagram of a gas turbine system.
Figure 2:
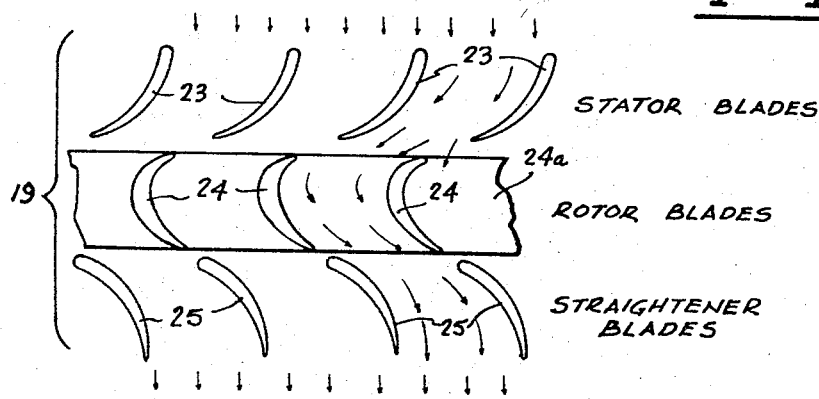
FIGURE 2 is a diagram illustrating the blade structure developed on a flat surface of a traction turbine for use in the system of FIGURE 1.

FIGURE 1 shows a gas generator 10 composed of a compressor 11, a combustor 12 and a compressor turbine 13. Air flows into the compressor 11 through intake 14 and from the compressor 11 to the combustor 12 through conduit 15. The combustion gases flow from the combustor 12 to the compressor turbine 13 through conduit 16, and the turbine 13 drives the shaft 17 of the compressor 11. The combustion gases leave the compressor turbine 13 through conduit 18 to drive the traction turbine 19 and are finally exhausted through conduit 20. The shaft 21 of the traction turbine 19 drives the vehicle wheels (not shown) through gearing 22. This arrangement is conventional. FIGURE 2 shows a diagrammatic representation of a few of the stator blades 23 and a few of the rotor blades 24 of the rotor 24a of the traction turbine 19. These two sets of blades are also conventional.

In accordance with the present invention, the traction turbine 19 is also fitted with a set of straightener blades 25 arranged immediately downstream of the rotor blades 24. Like the stator blades 23 the straightener blades 25 are mounted on the fixed structure of the turbine, but in a special manner which will be described in more detail below in connection with FIGURE 3.

The arrows in FIGURE 2 show the gas flow conditions at vehicle standstill, that is to say with the rotor blades 24 stationary in relation to the stator and straightener blades 23 and 25. It will be observed that as the gas flow leaves the trailing edges of the rotor blades 24, it contains a substantial circumferential velocity component in the direction from left to right in FIGURE 2, that is, in the opposite circumferential direction from that in which the rotor blades will move when the latter is freed by release of the vehicle brakes. When the vehicle is travelling at speed, the forward movement of the rotor blades 24 compensates for the rearward sweep of their trailing edges, so that the gas flow emerge from the downstream side of the rotor in predominantly an axial direction of travel. However, with the rotor stationary, a very significant circumferential velocity component is imparted to the gases leaving the downstream side of the rotor and this component represents an appreciable pressure loss in the system.

By providing the straightener blades 25 immediately downstream of the blades 24, the gases issuing from the stationary rotor are straightened and are returned to substantially axial flow, with the result that the pressure drop across the traction turbine is reduced. The total pressure drop from the combustor 12 to the exhaust 20 (which is at atmospheric pressure) takes place in two turbines 13 and 19. For a given total pressure drop, that, is for a given fuel consumption, a reduction in the pressure drop across the traction turbine 19 means that a greater pressure drop now appears across the compressor turbine 13. This causes the compressor turbine to rotate at a higher speed, for the same fuel consumption in the combustor 12. The higher speed of the compressor turbine 13 in the idling condition results in faster acceleration from standstill, because, when the throttle is opened, less time is required for the shaft 17 to increase speed for the gas generator 10 to supply the additional flow of gas needed for the traction turbine 19 to generate full power in its shaft 21. Alternatively, for the same speed of rotation of the compressor turbine 13, a lower total pressure drop is required, when less fuel can be burnt during idling in the combustor 12. In practice some compromise combination of these two considerations can be adopted.

When the system is employed for locomotive use, where accelertaion is inevitably slow, by virtue of the inertia of the train, the gas generator 10 quickly runs up to full power before the traction turbine 19 has hardly begun to move. The straightener blades are effective in this case, because the reduced pressure drop in the virtually stationary traction turbine resulting from their use enables, in general and within the limits of choking, an increased volume of flow of gas to pass through the traction turbine. This increased flow enhances the torque which is developed at the shaft 21 while the traction turbine is still stationary and is beginning to move only slowly. For best performance in locomotive or automobile, the straightener blades 25 will ideally be matched in shape to the rotor blades 24 for full straightening of the gas flow to the axial direction at rotor standstill.

Once the traction turbine attains a significant speed (say 20% of full speed), the straightener blades begin to become undesirable, because the gas issuing from the downstream edges of the rotor blades 24 now begins to flow more axially. This gas would impinge upon the convex surfaces of the straightener blades 25, which would represent an added impedance to flow and hence an increased pressure drop in the turbine. Thus, once the turbine has begun to gain speed, the presence of the blades 25 would reduce its efficiency. It is therefore a feature of the present invention that the blades 25 are rendered innocuous once the traction turbine has gained a certain speed. Their function is only advantageous while the rotor is at standstill or is turning at a relatively low speed, for example up to 20% of full speed.

Figure 3:
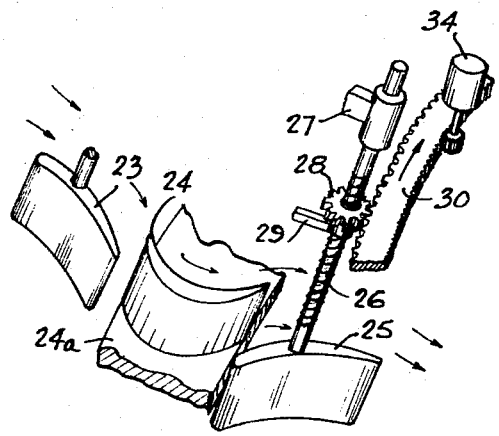
FIGURE 3 is a fragmentary diagram illustrating a manner of control of the arrangement shown in FIGURE 2.

FIGURE 3 shows one method by which the blades 25 may be rendered innocuous, namely by being removed altogether from the system. Here a typical blade 25 is shown as supported on a threaded rod 26 which is slidingly supported in a collar 27 secured to the fixed structure of the turbine. The rod 26 is threaded into an internally threaded spur wheel 28 freely rotatably supported by a bracket 29 secured to the fixed structure of the turbine. A ring gear 30 meshes with each of the spur wheels 28 so that rotation of these wheels by the gear 30 will raise the blades 25 upwardly and out of the path of gas flowing downstream from the rotor blades 24.

Figure 4:
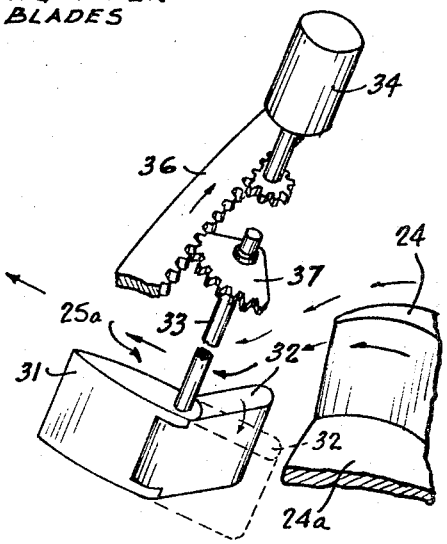
FIGURE 4 shows an alternative construction.

An alternative method of rendering the blades 25 innocuous is shown in FIGURE 4 where the direction of gas flow is shown reversed from that of FIGURE 3. In FIGURE 4 an articulated straightener blade 25a has been used to replace each of the blades 25, the blade 25a having a straight tail portion 31 joined to a nose portion 32 which is rotatable by a spindle 33 between the full line position shown in FIGURE 4 when the shape of the blade approximates that of a blade 25, and the broken line position shown in FIGURE 4, when the blade is straight and extends axially in the gas flow to represent comparatively little impedance to the gas flow. The spindles 33 of each of the blades 25a are operated simultaneously by appropriate means such as a ring gear 36 which rotates a toothed segment 37 secured to each of the spindles 33. This articulated form of straightener blade 25a permits gradual changing of the shape of the blades to match the gas flow conditions, as the rotor increases speed and the gas issuing from the downstream side of the rotor blades 24 becomes increasingly more axial. The flow will be axial at design speed. Above design speed the gas flow will begin to assume a reverse circumferential component, at which time the nose portions 32 may be rotated beyond the broken line position shown.

Thus, the straightener blades may be rendered innocuous either by their complete removal from the passages through which the gases flow, or by being constructed to be movable progressively between one or more operative positions in which they act to straighten (that is, make more nearly axial) a gas flow having various values of a circumferential component, and essentially an inoperative position in which they represent an impedance to axial flow that is sufficiently small to be tolerated.

Any convenient method may be employed for withdrawing the blades 25 or for moving the blades 25a. For example, these parts may be operated by a motor 34 shown also in FIGURE 1 as controlled by a governor 35 driven from the shaft 21.

I claim:
1. An axial flow gas turbine comprising,
   (a) stator means,
   (b) rotor means including a set of rotor blades having concave surfaces for receiving gas from said stator means, and, at rotor standstill, for imparting to said gas a component of velocity in a circumferential direction,
   (c) a set of straightener blades located immediately downstream of the rotor blades,
   (d) each said straightener blade comprising a fixed axially extending tail portion, and, upstream thereof, a nose portion pivotally connected to said tail portion,
   (e) means for moving said nose portion between a pair of positions, in a first of which positions said nose portion extends axially as a continuation of said tail portion, and in the second of which positions said nose portion is inclined to the axial direction for receiving said gas having said circumferential component at rotor standstill and for deflecting said gas to discharge the same substantially axially,
   (f) and means sensitive to the speed of rotation of said rotor means,
   (g) said sensitive means (f) being connected to said moving means (e) for moving the nose portions of said straightener blades from said second position towards said first position upon detection by said sensitive means (f) of a speed of said rotor means above a low speed, for rendering said straightener blades substantially non-deflecting to gas flow.

2. An axial flow gas turbine comprising,
   (a) stator means,
   (b) rotor means including a set of rotor blades having concave surfaces for receiving gas from said stator means, and, at rotor standstill, for imparting to said gas a component of velocity in the circumferential direction,
   (c) a set of curved, straightener blades, (d) means mounting said straightener blades, each to be movable between a pair of positions, in a first of which positions said curved straightener blades are so disposed and located immediately downstream of said rotor blades and are so shaped for receiving said gas with said circumferential component at rotor standstill and deflecting said gas to discharge the same substantially entirely axially, and in a second of which positions each of said straightener blades is wholly removed from the gas flow downstream of said rotor blades, (e) and means sensitive to the speed of rotation of said rotor means, (f) said means (e) being connected to said means (d) for moving said straightener blades from said first position to said second position upon detection of a speed of said rotor means above a low speed.

References Cited by the Examiner

UNITED STATES PATENTS

| | | | |
|---|---|---|---|
| 2,093,127 | 9/1937 | Fottinger | 60—54 |
| 2,187,937 | 1/1940 | Sensaud de Lavaud | 60—54 |
| 2,222,618 | 11/1940 | Jandasek | 60—54 X |
| 2,941,781 | 6/1960 | Boyum. | |
| 2,958,188 | 11/1960 | Leitner et al. | 60—35.6 |
| 2,962,258 | 11/1960 | Wagner | 253—59 |
| 3,112,913 | 12/1963 | Irwin | 253—59 |

JULIUS E. WEST, *Primary Examiner.*